United States Patent
MacLean

(10) Patent No.: US 10,409,806 B2
(45) Date of Patent: *Sep. 10, 2019

(54) TRANSACTION MANAGEMENT SYSTEM

(71) Applicant: Open Text SA ULC, Halifax (CA)

(72) Inventor: John M. MacLean, Braintree, MA (US)

(73) Assignee: Open Text SA ULC, Halifax (CA)

( * ) Notice: Subject to any disclaimer, the term of this patent is extended or adjusted under 35 U.S.C. 154(b) by 337 days.

This patent is subject to a terminal disclaimer.

(21) Appl. No.: 15/005,701

(22) Filed: Jan. 25, 2016

(65) Prior Publication Data

US 2016/0154842 A1  Jun. 2, 2016

Related U.S. Application Data

(63) Continuation of application No. 14/016,919, filed on Sep. 3, 2013, now Pat. No. 9,275,413, which is a
(Continued)

(51) Int. Cl.
*G06F 16/23* (2019.01)
*G06F 16/951* (2019.01)
(Continued)

(52) U.S. Cl.
CPC .... *G06F 16/2379* (2019.01); *G06F 16/24565* (2019.01); *G06F 16/951* (2019.01);
(Continued)

(58) Field of Classification Search
CPC ......... G06F 17/30873; G06F 17/30867; G06F 17/30861; G06F 17/30551; G06F 11/3476;
(Continued)

(56) References Cited

U.S. PATENT DOCUMENTS

| 4,773,003 A | 9/1988 | Hauge |
| 4,949,252 A | 8/1990 | Hauge |

(Continued)

FOREIGN PATENT DOCUMENTS

| GB | 2306863 | 5/1997 |
| WO | WO 95/31780 | 11/1995 |
| WO | WO 98/42103 | 9/1998 |

OTHER PUBLICATIONS

Office Action for U.S. Appl. No. 09/782,477, dated Jul. 6, 2004, 12 pgs.
(Continued)

*Primary Examiner* — James E. Richardson
(74) *Attorney, Agent, or Firm* — Sprinkle IP Law Group

(57) ABSTRACT

The systems and methods described herein relate to a system for documenting transactions. A filter is provided that captures content associated with transactions. The filter may be configured to start and stop the capture at predetermined times, and may be further configured to specify what content is to be captured during a transaction. The system may store any documents or data associated with a transaction, including dynamic content and user selections and inputs. A document repository may be provided for storing unstructured data representing data, text, forms, and so forth presented to a party during a transaction. A viewer may be provided for displaying data stored in the document repository.

21 Claims, 7 Drawing Sheets

Related U.S. Application Data continuation of application No. 12/846,463, filed on Jul. 29, 2010, now Pat. No. 8,543,537, which is a continuation of application No. 11/903,373, filed on Sep. 21, 2007, now Pat. No. 7,792,958, which is a continuation of application No. 09/782,477, filed on Feb. 13, 2001, now Pat. No. 7,287,071.

(60) Provisional application No. 60/235,973, filed on Sep. 28, 2000.

(51) Int. Cl.

| | | |
|---|---|---|
| *G06F 16/954* | (2019.01) | |
| *G06F 16/2455* | (2019.01) | |
| *G06Q 20/38* | (2012.01) | |
| *H04L 12/26* | (2006.01) | |
| *H04L 29/08* | (2006.01) | |
| *G06Q 10/08* | (2012.01) | |
| *G06Q 40/00* | (2012.01) | |

(52) U.S. Cl.
CPC ......... *G06F 16/954* (2019.01); *G06Q 10/087* (2013.01); *G06Q 20/389* (2013.01); *G06Q 40/00* (2013.01); *H04L 43/00* (2013.01); *H04L 67/10* (2013.01); *H04L 67/22* (2013.01); *H04L 69/329* (2013.01)

(58) Field of Classification Search
CPC ............. G06F 11/3414; G06F 16/2379; G06F 16/24565; G06F 16/954; G06F 16/951; G06Q 30/00; G06Q 40/00; G06Q 10/087; G06Q 20/389; H04L 67/14; H04L 67/22; H04L 67/10; H04L 69/329; H04L 43/00
See application file for complete search history.

(56) References Cited

U.S. PATENT DOCUMENTS

| | | | | |
|---|---|---|---|---|
| 5,426,730 | A * | 6/1995 | Miyake | G05B 19/058 |
| | | | | 345/660 |
| 5,577,254 | A | 11/1996 | Gilbert | |
| 5,809,250 | A | 9/1998 | Kisor | |
| 5,822,532 | A | 10/1998 | Ikeda | |
| 6,096,096 | A | 8/2000 | Murphy et al. | |
| 6,101,482 | A | 8/2000 | DiAngelo et al. | |
| 6,195,679 | B1 | 2/2001 | Bauersfeld | |
| 6,199,104 | B1 | 3/2001 | Delph | |
| 6,223,213 | B1 | 4/2001 | Cleron et al. | |
| 6,236,987 | B1 | 5/2001 | Horowitz et al. | |
| 6,237,138 | B1 | 5/2001 | Hameluck et al. | |
| 6,266,681 | B1 | 7/2001 | Guthrie | |
| 6,286,030 | B1 | 9/2001 | Wenig et al. | |
| 6,414,725 | B1 | 7/2002 | Clarin et al. | |
| 6,449,739 | B1 * | 9/2002 | Landan | G06F 11/323 |
| | | | | 709/224 |
| 6,493,758 | B1 | 12/2002 | McLain | |
| 6,526,442 | B1 | 2/2003 | Stupek et al. | |
| 6,601,047 | B2 | 7/2003 | Wang et al. | |
| 6,662,226 | B1 | 12/2003 | Wang | |
| 6,667,751 | B1 | 12/2003 | Wynn et al. | |
| 6,697,824 | B1 | 2/2004 | Bowman-Amuah | |
| 6,714,931 | B1 | 3/2004 | Papierniak et al. | |
| 6,745,367 | B1 | 6/2004 | Bates | |
| 6,883,032 | B1 | 4/2005 | Dempski | |
| 6,978,304 | B2 | 12/2005 | Fertell et al. | |
| 7,031,961 | B2 | 4/2006 | Pitkow et al. | |
| 7,047,296 | B1 | 5/2006 | Safstrom | |
| 7,076,546 | B1 * | 7/2006 | Bates | G06Q 10/10 |
| | | | | 709/224 |
| 7,188,176 | B1 * | 3/2007 | Nedderman | H04L 65/1069 |
| | | | | 707/E17.116 |
| 7,219,138 | B2 | 5/2007 | Straut et al. | |
| 7,287,071 | B2 | 10/2007 | MacLean | |
| 7,685,273 | B1 | 3/2010 | Anastas et al. | |
| 7,792,958 | B1 | 9/2010 | MacLean | |
| 8,543,537 | B2 | 9/2013 | MacLean | |
| 9,275,413 | B2 | 3/2016 | MacLean | |
| 2002/0029290 | A1 | 3/2002 | Burema | |
| 2002/0038388 | A1 | 5/2002 | Netter | |
| 2002/0082929 | A1 * | 6/2002 | Wang | G06Q 20/04 |
| | | | | 705/27.1 |
| 2002/0143931 | A1 | 10/2002 | Smith | |
| 2003/0061506 | A1 | 3/2003 | Cooper | |
| 2004/0267820 | A1 | 12/2004 | Boss et al. | |
| 2010/0312772 | A1 | 12/2010 | MacLean | |
| 2012/0016678 | A1 * | 1/2012 | Gruber | G06F 17/3087 |
| | | | | 704/275 |

OTHER PUBLICATIONS

Office Action for U.S. Appl. No. 09/782,477, dated Apr. 21, 2005, 14 pgs.
Office Action for U.S. Appl. No. 09/782,477, dated Oct. 25, 2005, 14 pgs.
Examiner's Report issued in Australian Patent Application No. 2001293078, dated Jan. 13, 2006, 2 pages.
Office Action for U.S. Appl. No. 09/782,477, dated Apr. 19, 2006, 17 pgs.
Office Action for U.S. Appl. No. 09/782,477, dated Dec. 18, 2006, 20 pgs.
Office Action for U.S. Appl. No. 11/903,373, dated Dec. 15, 2008, 6 pgs.
Office Action for U.S. Appl. No. 11/903,373, dated Jul. 22, 2009, 14 pgs.
Office Action for U.S. Appl. No. 11/903,373, dated Dec. 23, 2009, 5 pgs.
Office Action for U.S. Appl. No. 12/846,463, dated Mar. 20, 2012, 29 pgs.
Office Action for U.S. Appl. No. 12/846,463, dated Sep. 28, 2012, 42 pgs.
Office Action for U.S. Appl. No. 14/016,919, dated Jun. 3, 2015, 29 pgs.

* cited by examiner

TRANSACTION MANAGEMENT SYSTEM

CROSS-REFERENCE TO RELATED APPLICATIONS

This application is a continuation of, and claims a benefit of priority under 35 U.S.C. § 120 from U.S. patent application Ser. No. 14/016,919, filed Sep. 3, 2013, entitled "TRANSACTION MANAGEMENT SYSTEM," which is a continuation of, and claims a benefit of priority from U.S. patent application Ser. No. 12/846,463, filed Jul. 29, 2010, issued as U.S. Pat. No. 8,543,537, entitled "TRANSACTION MANAGEMENT SYSTEM," which is a continuation of, and claims a benefit of priority from U.S. patent application Ser. No. 11/903,373, filed Sep. 21, 2007, issued as U.S. Pat. No. 7,792,958, entitled "TRANSACTION MANAGEMENT SYSTEM," which is a continuation of, and claims a benefit of priority from U.S. patent application Ser. No. 09/782,477, filed Feb. 13, 2001, issued as U.S. Pat. No. 7,287,071, entitled "TRANSACTION MANAGEMENT SYSTEM," which is a conversion of and claims a benefit of priority from U.S. Provisional Application No. 60/235,973, filed Sep. 28, 2000. The entire contents of applications listed in this paragraph are hereby expressly incorporated by reference herein for all purposes.

FIELD OF THE INVENTION

The invention relates to transaction management systems. More particularly, the invention relates to methods and systems for capturing and managing transactions, and electronic documents related thereto, conducted in a computer environment.

BACKGROUND

The emergence of networked computing, and in particular, increasingly accessible networks such as the Internet and the World Wide Web, has made possible a wide variety of computerized transactions and electronic commerce. This may include one-time consumer transactions such as a purchase of a product online, as well as business-to business transactions, and complex consumer transactions such as mortgage lending, insurance, licensing, and so forth. When conducted using computers, transactions may involve data collection, presentation of multimedia such as text, graphics, and sound, dynamic data generation, exchange of other data types such as facsimiles, and so forth.

As a significant disadvantage, transactions involving significant exchanges of information in various formats may not be well documented, so that a party to a transaction may be unable to demonstrate a term or terms of the transaction that the party believed to be material.

There remains a need for a system that captures documents and electronic data associated with a transaction.

SUMMARY

The systems and methods described herein relate to a system for documenting transactions. A filter is provided that captures content associated with transactions. The filter may be configured to start and stop the capture at predetermined times, and may be further configured to specify what content is to be captured during a transaction. The system may store any documents or data associated with a transaction, including dynamic content and user selections and inputs. A document repository may be provided for storing unstructured data representing data, text, forms, and so forth presented to a party during a transaction. A viewer may be provided for displaying data stored in the document repository.

A transaction management system described herein may includes: a server that hosts a transaction; a network; a client connected in a communicating relationship with the server over the network, and the client participating in the transaction hosted by the server; and a filter operating between the server and the client to capture data associated with the transaction.

The filter may operate on the server that hosts the transaction. The system may include a second server connected in a communicating relationship with the server that hosts the transaction and connected in a communicating relationship with the client, wherein the filter operates on the second server. The system may include a document repository that stores data captured by the filter. The document repository may store unstructured data captured by the filter, the unstructured data including data having a plurality of formats. The data may be indexed according to at least one of a transaction type, a transaction party, a transaction time, or a transaction identifier. The system may include a viewer for viewing the unstructured data stored in the document repository.

The unstructured data may include a record of a transaction between the server and the client, as displayed to a user at the client during the transaction. The unstructured data may include at least one of facsimile data, print stream data, application document data, hypertext transfer protocol data, graphics data, and audio data. The filter may be configured to begin capture upon occurrence of one or more predetermined events. The filter may be configured to stop capture upon occurrence of one or more predetermined events. The system may include a configuration interface with which a user selects data to be captured during the transaction.

In one aspect, there is disclosed herein a method for managing transactions conducted over a network that includes: detecting a first event; in response to the first event, initiating a capture of data communicated between a client and a server; detecting a second event; in response to detection of the second event, stopping the capture of data communicated between the client and the server; and storing the captured data.

Storing the captured data may be performed after detecting the second event. The method may further include retrieving the captured data and displaying the captured data in the form that the data was displayed by the client when the data was captured. The captured data may include a hypertext transfer protocol session. The method may further include: capturing a form from the server; capturing data relating to the form from the client; and storing the data relating to the form from the client in the form as one or more default values of the form. The method may further include, in response to the first event, initiating a capture of data communicated between the client and a third-party provider of content. The content may include a banner advertisements or a price quotation. The first event may include navigation by the client to one or more predetermined addresses. The second event includes navigation by the client to one or more predetermined addresses. The method may further include configuring the first event and the second event to correspond to one or more predetermined universal resource locators. The method may further include configuring one or more attributes by which the data is indexed. The method may further include configuring the capture of data to include a portion of the data communicated between the client and the server, the portion being less than all of the data communicated between the client and the server. The data communicated between the client and the server may include data relating to an electronic commerce transaction between the client and the server.

In another aspect, there is described herein a system for managing transactions conducted over a network, including: first detecting means for detecting a first event; capturing means for capturing data communicated between a client and a server in response to a detection of the first event by the first detecting means; second detecting means for detecting a second event, the capturing means stopping the capture of data in response to a detection by the second detecting means of the second event; and storing means for storing the captured data.

In another aspect, there is described herein a method of doing business that includes providing a filter for capturing an electronic commerce transaction between a server and a client, the server hosting the electronic commerce transaction, and the filter capturing the electronic commerce transaction in a form that permits review of the transaction as displayed to the client during the transaction, the filter being configurable to control a first event that begins the capture of the transaction, a second event that ends the capture of the transaction, and one or more types of data to be included in the capture of the transaction.

The method may include storing the electronic commerce transaction in a document repository and providing a viewer for reviewing the transaction stored in the document repository. The filter may reside on a client system and the filter may operate as a proxy to the server that hosts the electronic commerce transaction. The filter may reside on a second server, the second server operating as a proxy to the server that hosts the electronic commerce transaction and the client. Access to the document repository may be provided as a service to at least one of the client or the server. The method may include using the captured electronic commerce transaction to verify the transaction after the transaction has been completed.

BRIEF DESCRIPTION OF THE DRAWINGS

The foregoing and other objects and advantages of the invention will be appreciated more fully from the following further description thereof, with reference to the accompanying drawings, wherein.

DETAILED DESCRIPTION

The description below pertains to several illustrative embodiments of the invention. Although many variations of the invention may be envisioned by one skilled in the art, such variations and improvements are intended to fall within the compass of this disclosure. Thus, the scope of the invention is not to be limited in any way by the disclosure below.

Figure 1:
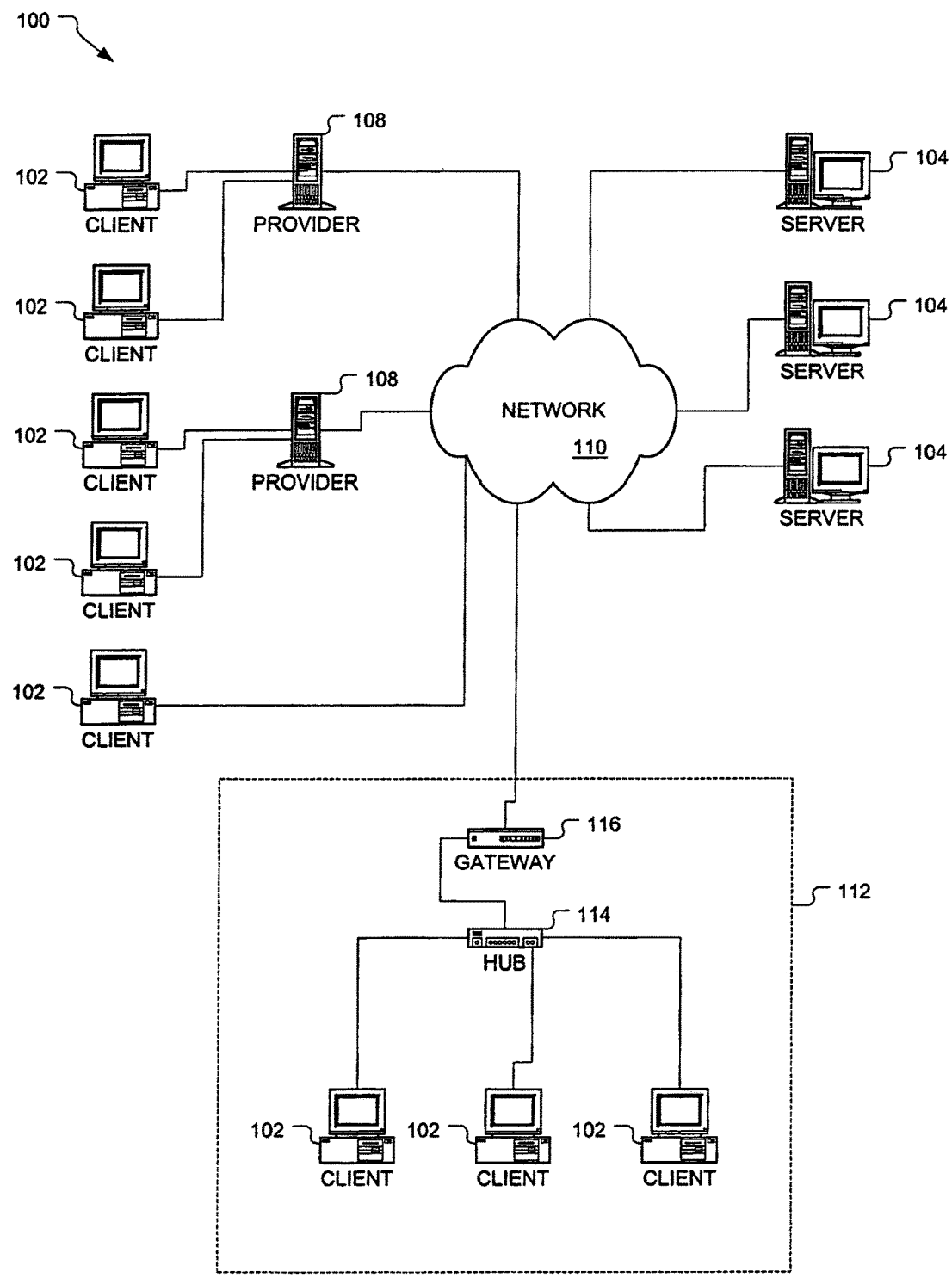
FIG. 1 shows a schematic diagram of the entities involved in an embodiment of a method and system disclosed herein.

FIG. 1 shows a schematic diagram of the entities involved in an embodiment of a method and system disclosed herein. In a system 100, a plurality of clients 102, servers 104, and providers 108 are connected via an internetwork 110. It should be understood that any number of clients 102, servers 104, and providers 108 could participate in such a system 100. The system may further include one or more local area networks ("LAN") 112 interconnecting clients 102 through a hub 114 (in, for example, a peer network) or a local area network server 114 (in, for example, a client-server network). The LAN 112 may be connected to the internetwork 110 through a gateway 116, which provides security to the LAN 112 and ensures operating compatibility between the LAN 112 and the internetwork 110. Any data network may be used as the internetwork 110 and the LAN 112.

In one embodiment, the internetwork 110 is the Internet, and the World Wide Web provides a system for interconnecting clients 102 and servers 104 through the Internet 110. The internetwork 110 may optionally include a cable network, where at least one of the clients 102 is a set-top box, cable-ready game console, or the like.

An exemplary client 102 may include a processor, a memory (e.g. RAM), a bus which couples the processor and the memory, a mass storage device (e.g. a magnetic hard disk or an optical storage disk) coupled to the processor and the memory through an I/O controller, and a network interface coupled to the processor and the memory, such as a modem, a digital subscriber line ("DSL") card, a cable modem, a network interface card, a wireless network card, or some other interface device capable of wired, fiber optic, or wireless data communications. One example of such a client 102 is a personal computer equipped with an operating system such as Microsoft Windows 95, Microsoft Windows NT, Unix, Linux, and Linux variants, along with software support for Internet communication protocols. The personal computer may also include a browser program, such as Microsoft Internet Explorer or Netscape Navigator, to provide a user interface for access to the Internet 110. Although the personal computer is a typical client 102, the client 102 may also be a workstation, mobile computer, Web phone, television set-top box, interactive kiosk, personal digital assistant, or other device capable of communicating over the Internet 110. As used herein, the term "client" is intended to refer to any of the above-described clients 102 or other client devices, and the term "browser" is intended to refer to any of the above browser programs or other software or firmware providing a user interface for navigating an internetwork 110 such as the Internet.

An exemplary server 104 includes a processor, a memory (e.g. RAM), a bus which couples the processor and the memory, a mass storage device (e.g. a magnetic or optical disk) coupled to the processor and the memory through an I/O controller, and a network interface coupled to the processor and the memory. Servers may be clustered together to handle more client traffic, and may include separate servers for different functions such as a database server, an application server, and a Web presentation server. Such servers may further include one or more mass storage devices such as a disk farm or a redundant array of independent disk ("RAID") system for additional storage and data integrity. Read-only devices, such as compact disk drives and digital versatile disk drives, may also be connected to the servers. Suitable servers and mass storage devices are manufactured by, for example, Compaq, IBM, and Sun Microsystems. As used herein, the term "server" is intended to refer to any of the above-described servers 104, or any other device that may be used to provide access, functionality, or content in a networked environment.

Focusing now on the internetwork 110, one embodiment is the Internet. The structure of the Internet 110 is well known to those of ordinary skill in the art and includes a network backbone with networks branching from the backbone. These branches, in turn, have networks branching from them, and so on. The backbone and branches are connected by routers, bridges, switches, and other switching elements that operate to direct data through the internetwork 110. For a more detailed description of the structure and operation of the Internet 110, one may refer to "The Internet Complete Reference," by Harley Hahn and Rick Stout, published by McGraw-Hill, 1994.

However, one may practice the invention on a wide variety of communication networks. For example, the internetwork 110 can include interactive television networks, telecommunications networks, wireless voice or data transmission systems, two-way cable systems, customized computer networks, interactive kiosk networks and automatic teller machine networks.

One embodiment of the internetwork 110 includes Internet service providers 108 offering dial-in service, such as Microsoft Network, America OnLine, Prodigy and CompuServe. It will be appreciated that the Internet service providers 108 may also include any computer system which can provide Internet access to a client 102. Of course, the Internet service providers 108 are optional, and in some cases, the clients 102 may have direct access to the Internet 110 through a dedicated DSL service, ISDN leased lines, TI lines, digital satellite service, cable modem service, or any other high-speed connection. Any of these high-speed services may also be offered through one of the Internet service providers 108.

In its present deployment as the Internet, the internetwork 110 consists of a worldwide computer network that communicates using the well-defined Transmission Control Protocol ("TCP") and Internet Protocol ("IP") to provide transport and network services. Computer systems that are directly connected to the Internet 110 each have a unique IP address. The IP address consists of four one-byte numbers (although a planned expansion to sixteen bytes is underway with IPv6). The four bytes of the IP address are commonly written out separated by periods such as "64.244.158.2". To simplify Internet addressing, the Domain Name System ("DNS") was created. The DNS allows users to access Internet resources with an alphanumeric naming system. A DNS name consists of a series of alphanumeric names separated by periods. For example, the name "www.towertech.com" corresponds to a particular IP address. When a domain name is used, the computer accesses a DNS server to obtain the explicit four-byte IP address.

It will be appreciated that other internetworks 110 may be used with the invention. For example, the internetwork 110 may be a wide-area network, a local area network, or corporate area network. The internetwork 110 may be any other network used to communicate data, such as a cable broadcast network.

To further define the resources on the Internet 110, the Uniform Resource Locator system was created. A Uniform Resource Locator ("URL") is a descriptor that specifically defines a type of Internet resource along with its location. URLs have the following format:

resource-type://domain.address/path-name where resource-type defines the type of Internet resource. Web documents are identified by the resource type "http" which indicates that the hypertext transfer protocol should be used to access the document. Other common resource types include "ftp" (file transmission protocol), "mailto" (send electronic mail), "file" (local file), and "telnet." The domain address defines the domain name address of the computer that the resource is located on. Finally, the path-name defines a directory path within the file system of the server that identifies the resource. As used herein, the term "IP address" is intended to refer to the four-byte Internet Protocol address, and the term "Web address" is intended to refer to a domain name address, along with any resource identifier and path name appropriate to identify a particular Web resource. The term "address," when used alone, may refer to either a Web address or an IP address.

In an exemplary embodiment, a browser, executing on one of the clients 102, retrieves a Web document at an address from one of the servers 104 via the internetwork 110, and displays the Web document on a viewing device, e.g., a screen. A user can retrieve and view the Web document by entering, or selecting a link to, a URL in the browser. The browser then sends an http request to the server 104 that has the Web document associated with the URL. The server 104 responds to the http request by sending the requested Web document to the client 102. The Web document is an HTTP object that includes plain text (ASCII) conforming to the HyperText Markup Language ("HTML"). Other markup languages are known and may be used on appropriately enabled browsers and servers, including the Dynamic HyperText Markup Language ("DHTML"), the Extensible Markup Language ("XML"), the Extensible Hypertext Markup Language ("XHML"), and the Standard Generalized Markup Language ("SGML").

Each Web document usually contains hyperlinks to other Web documents. The browser displays the Web document on the screen for the user and the hyperlinks to other Web documents are emphasized in some fashion such that the user can identify and select each hyperlink. To enhance functionality, a server 104 may execute programs associated with Web documents using programming or scripting languages, such as Perl, C, C++, or Java, or a Common Gateway Interface ("CGI") script to access applications on the server.

Other examples may include Microsoft's Application Server Pages ("ASP") with a Component Object Model ("COM") interface, or Java Server Pages with a JavaBeans interface. A server 104 may also use server-side scripting languages such as ColdFusion from Allaire, Inc., or PHP. These programs and languages perform "back-end" functions such as order processing, database management, and content searching. A Web document may also include references to small client-side applications, or applets that are transferred from the server 104 to the client 102 along with a Web document and executed locally by the client 102. Java is one popular example of a programming language used for applets. The text within a Web document may further include (non-displayed) scripts that are executable by an appropriately enabled browser, using a scripting language such as JavaScript or Visual Basic Script. Browsers may further be enhanced with a variety of helper applications to interpret various media including still image formats such as JPEG and GIF, document formats such as PS and PDF, motion picture formats such as AVI and MPEG, and sound formats such as MP3 and MIDI. These media formats, along with a growing variety of proprietary media formats, may be used to enrich a user's interactive and audio-visual experience as each Web document is presented through the browser. The term "page" as used herein is intended to refer to the Web document described above, as well as any of the above-described functional or multimedia content associated with the Web document.

Figure 2:
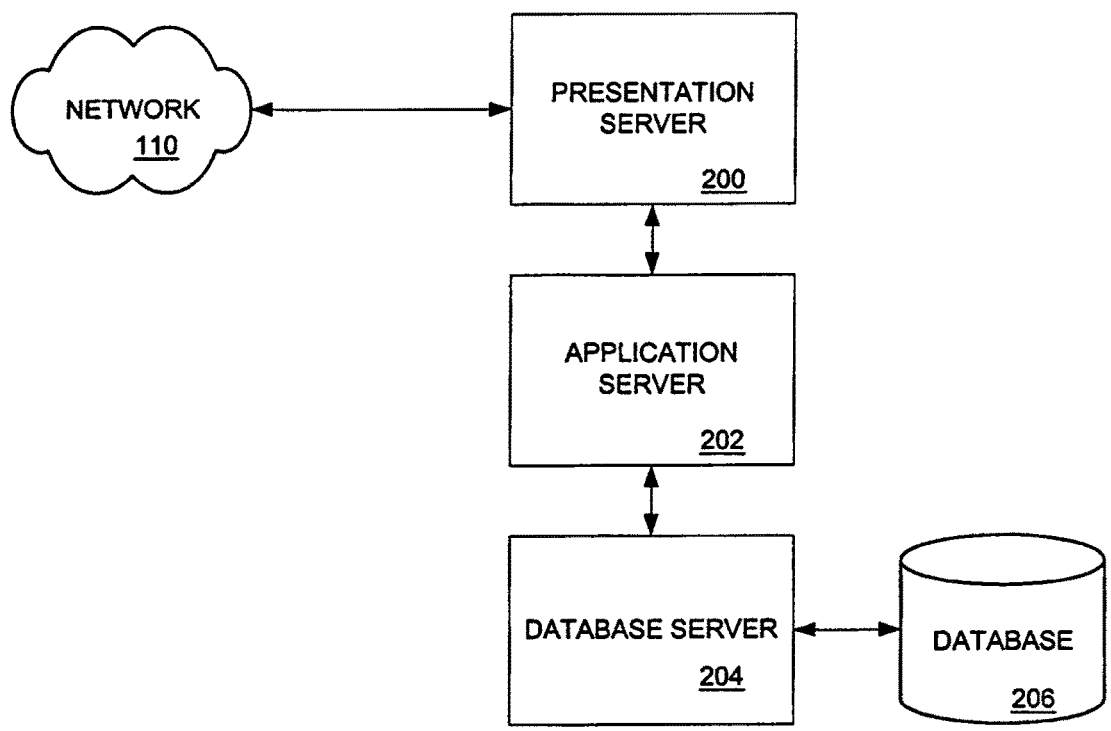
FIG. 2 shows a block diagram of a server that may be used with the invention.

FIG. 2 shows a block diagram of an embodiment of a server that may be used with the invention. In this embodiment, the server 104 includes a presentation server 200, an application server 202, and a database server 204. The application server 202 is connected to the presentation server 200. The database server 204 is also connected to the presentation server 200 and the application server 202, and is further connected to a database 206 embodied on a mass storage device. The presentation server 200 includes a connection to the internetwork 110. It will be appreciated that each of the servers may comprise more than one physical server, as required for capacity and redundancy, and it will be further appreciated that in some embodiments more than one of the above servers may be logical servers residing on the same physical device. It will further be appreciated that one or more of the servers may be at a remote location, and may communicate with the presentation server 200 through a local area or wide area network. The term "host," as used herein, is intended to refer to any combination of servers described above that include a presentation server 200 for providing access to pages by the clients 102. The term "site," as used herein, is intended to refer to a collection of pages sharing a common domain name address, or dynamically generated by a common host, or accessible through a common host (i.e., a particular page may be maintained on or generated by a remote server, but nonetheless be within a site).

The presentation server 200 provides an interface for one or more connections to the internetwork 110, thus permitting more than one of the clients 102 (FIG. 1) to access the site at the same time. The presentation server 200 may include a plurality of enterprise servers, such as the ProLiant Cluster available from Compaq Computer Corp., or a cluster of E250's from Sun Microsystems running Solaris 2.7. Other suitable servers are known in the art and are described in Jamsa, Internet Programming, Jamsa Press (1995), the teachings of which are herein incorporated by reference. The server maintains one or more connections to the Internet 110, possibly provided by a tier one provider, i.e., one of the dozen or so national/international Internet backbones with cross-national links of T3 speeds or higher, such as MCI, UUNet, BBN Planet, and Digex. Each server may be, for example, an iPlanet Enterprise Server 4.0 from the Sun/Netscape Alliance. The presentation servers may use Web server software, such as Apache or Microsoft's IIS.

The presentation server 200 may also, for example, use the Microsoft Windows NT operating system, with a "front end" written in Microsoft Active Server Page ("ASP"), or some other programming language or server software capable of integrating ActiveX controls, forms, Visual Basic Scripts, JavaScript, Macromedia Flash Technology multimedia, e-mail, and other functional and multimedia aspects of a page. Typically, the front end includes all text, graphics, and interactive objects within a page, along with templates used for dynamic page creation.

A client 102 (FIG. 1) accessing an address hosted by the presentation server 200 may receive a page from the presentation server 200 containing text, forms, scripts, active objects, hyperlinks, etc., which may be collectively viewed using a browser. Each page may consist of static content, i.e., an HTML text file and associated objects (*.avi, *.jpg, *.gif, etc.) stored on the presentation server, and may include active content including applets, scripts, and objects such as check boxes, drop-down lists, and the like. A page may be dynamically created in response to a particular client 102 request, including appropriate queries to the database server 204 for particular types of data to be included in a responsive page. It will be appreciated that accessing a page is more complex in practice, and includes, for example, a DNS request from the client 102 to a DNS server, receipt of an IP address by the client 102, formation of a TCP connection with a port at the indicated IP address, transmission of a GET command to the presentation server 200, dynamic page generation (if required), transmission of an HTML object, fetching additional objects referenced by the HTML object, and so forth.

The application server 202 may provide the "back end" functionality of the Web site, and includes connections to the presentation server 200 and the database server 204. In one embodiment, the presentation server 200 may comprise an enterprise server, such as one available from Compaq Computer Corp., running the Microsoft Windows NT operating system, or a cluster of E250's from Sun MicroSystems running Solaris 2.7. Back end software may provide functionality for electronic commerce, including order processing, billing, inventory management, financial transactions, shipping instructions, and the like. The electronic commerce software running on the application server 202 may include a software interface to the database server 204, as well as a software interface to the front end provided by the presentation server 200. The application server 200 may also use a Sun/Netscape Alliance Server 4.0. A payment transaction server may also be included to process payments at a Web site using third party services such as Datacash or WorldPay, or may process payments directly using payment server and banking software, along with a communication link to a bank.

The database server 204 may be an enterprise server, such as one available from Compaq Computer Corp., running, for example, a Microsoft Windows operating system such as Windows NT or Windows 2000. Or the database server 204 may include a cluster of E250's from Sun MicroSystems running Solaris 2.7, along with software components for database management. Suitable databases are provided by, for example, Oracle, Sybase, IBM's DB2 or UDB, and SQL Server. The database server 204 may also include one or more databases 206, typically embodied in a mass-storage device. The databases 206 may include, for example, sale item pricing information, mailing or emailing lists, purchase orders, customer information, product information, news items, and the templates used by the presentation server to dynamically generate pages. In operation, the database management software running on the database server 204 may receive properly formatted requests from the presentation server 200, or the application server 202. In response, the database management software reads data from, or writes data to, the databases 206, and generates responsive messages to the requesting server.

The database server 204 may also include a File Transfer Protocol ("FTP") server for providing downloadable files.

Figure 3:
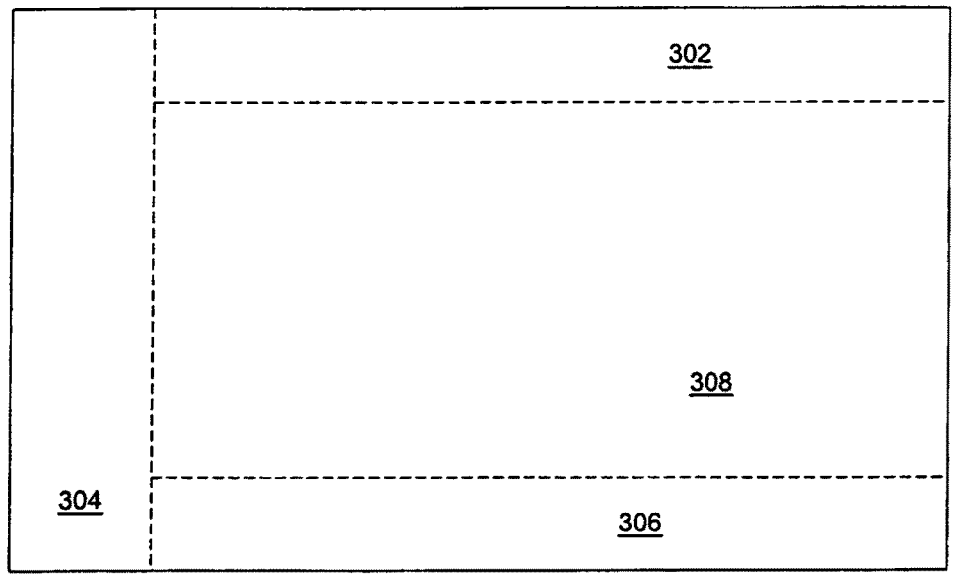
FIG. 3 shows a home page that may be used with the invention.

FIG. 3 shows a page according to the principles of the invention. The page 300 may include a header 302, a sidebar 304, a footer 306 and a main section 308, all of which may be displayed at a client 102 using a browser. The header 302 may include, for example, one or more banner advertisements and a title of the page. The sidebar 304 may include a menu of choices for a user at the client 102. The footer 306 may include another banner advertisement, as well as information concerning the page such as a "help" or "webmaster" contact, copyright information, disclaimers, a privacy statement, etc. The main section 308 may include content for viewing by the user. The main section 308 may also include, for example, tools for electronically mailing the page to an electronic mail ("e-mail") account. It will be appreciated that the description above is generic, and may be varied according to where a client 102 is within a Web site related to the page, as well as according to any available information about the client 102 (such as display size, media capabilities, etc.) or the user (such as profile information).

A Web site including the page 300 may use cookies to track users and user information. In particular, a client 102 accessing the site may be accessed to detect whether the client 102 has previously accessed the page or the site. If the client 102 has accessed the site, then some predetermined content may be presented to the client 102. If the client 102 does not include a cookie indicating that the client 102 has visited the site, then the client 102 may be directed to a registration page where information may be gathered to create a user profile. The client 102 may also be presented with a login page, so that a pre-existing user on a new client 102 may nonetheless bypass the registration page.

The site may provide options to the client 102. For example, the site may provide a search tool by which the client 102 may search for content within the site, or content external to the site but accessible through the internetwork 110. The site may include news items topical to the site. Banner ads may be provided in the page 300, and the ads may be personalized to a client 102 if a profile exists for that client 102. The banner ads may also track redirection. That is, when a client 102 selects a banner ad, the link and the banner ad may be captured and stored in a database. The site may provide a user profile update tool by which the client 102 may make alterations to a user profile. A secure communication medium may be provided between clients and the server using, for example, VeriSign Digital Server ID and Secure Socket Layer ("SSL") communication.

Figure 4:
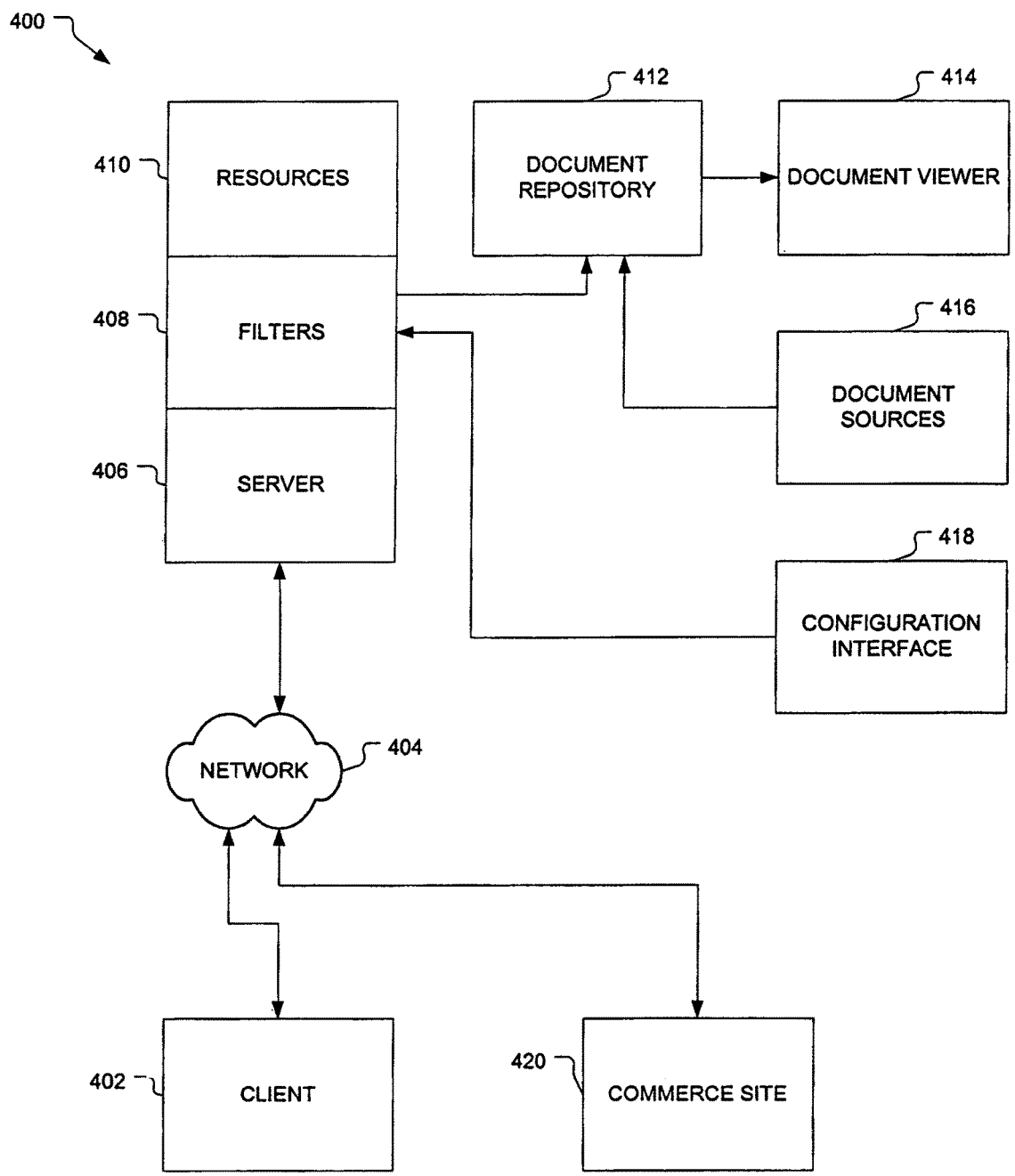
FIG. 4 shows a transaction management system that may be used with a network.

FIG. 4 shows a transaction management system that may be used with the World Wide Web. A system 400 may include a client 402 connected in communicating relationship through a network 404 to a server 406. The server 406 may communicate through filters 408 with one or more resources 410. The system 400 may also include a document repository 412, a document viewer 414, document sources 416, and a configuration interface 418. In certain embodiments, the system 400 may also include a commerce site 420, as will be described below.

The client 402, the network 404, and the server 406 may be, for example, those described above with reference to FIGS. 1-3. The resources 410 may be any resources for providing dynamic and static content to the client 402, including commercially available tools such as Java Server Pages, Active Server Pages, and so forth, as well as database resources, file transfer resources, Java Beans, Component Object Model ("COM") resources, or other resources that may be used with the server 406.

The filters 408 may reside between the server 406 and the resources 410, for example, between a presentation layer and any application logic layers within an n-tier server, so that any content presented to the client 402 may be captured. This may include static content or dynamic content, and may include, for example, HTML, XML, media such as audio, video, animation, and graphics, as well as database query results however formatted, and so forth. Where external content is included in a page, such as targeted advertisements that are retrieved from a remote site and included in a page presented by the server 406, the external content presented within a page may be captured and stored by the filters 408. The filters 408 may additionally capture user input from the client 402. For example, activation of controls such as checkboxes, radio buttons, scroll boxes, drop-down lists and the like within a page may be captured. Entries into text boxes and navigation through hyperlinks may be captured, as well as any files uploaded or downloaded by the client 402. The filters 408 may be created using any programming language, such as C or C++, that may communicate with resources 410 and the server 406, and pass data and control information between the resources 410 and the server 406.

The filters 408 may include one or more triggers to control activation and de-activation of a transaction capture. For example, the filters 408 may be activated when a user navigates to a specific page or a specific address, or activates a button within a page, or performs some other action. Upon activation of a trigger, the filters 408 may capture data and store the data in a document repository 412. The filters 408 may be configured using a configuration interface 418 that provides user control over, for example, triggers to start a transaction capture, triggers to stop a transaction capture, and content captured during the transaction capture. The configuration interface 418 may be an interface provided on a device hosting the server 406, or may be an interface that accesses the server 406 and the filters 408 through a Local Area Network ("LAN"), Virtual Private Network ("VPN"), or other network. The configuration interface 418 may access the server 406 and the filters 408 remotely, such as through a dial-in connection or through the network 404.

When the filters 406 are triggered to start capturing user interaction, data may be captured and transmitted to the document repository 412. The document repository 412 may be used to store unstructured data, including, for example, documents created by various applications, multimedia including audio data and video data, HTML streams, HTML forms, Electronic Document Integration ("EDI") files and data, electronic mail, text, scanned documents, faxed documents, screen captures, images such as bitmaps, *.jpg files, *.png files, and the like, print streams in postscript or other formats, customer statements maintained on remote systems, and so forth. The data may also include XML, forms, scripts, and the like.

Optical character recognition or other techniques may be included for textual interpretation of non-text-based formats. The filters 408 may capture any authentication data including passwords, digital signatures, credit card numbers, keys for secure communication, and so forth. It will be appreciated that, under certain privacy constraints or for other reasons, some data that may be available for capture will explicitly not be captured by the system, under control of the configuration interface 418. While a session with the server 406 is one source of documents and data, other document sources 416 may provide data to the document repository 412, including printers, facsimile machines, electronic mail servers, applications, databases, financial transaction networks, and so on.

The document repository 412 may provide a hierarchical system of folders for client devices, users, and/or specific transactions. Within each folder may be stored any data relating to a transaction, or more generally, any data captured by the filters 408 or received from the document sources 416. It will be appreciated that, while data may presented hierarchically for purposes of browsing, the data may be stored sequentially and indexed according to one or more attributes for subsequent search and retrieval. Attributes may include, for example, transaction participants, a transaction type, a time, a date, a transaction identification number, a file type, a creation date/time, a file name, a file size, and so forth. The document repository 412 may reside on a remote network device, accessible to the filters 408 and the document viewer 414 through a communication interface such as a Web server. Data and documents in the data repository 412 may be reviewed using data mining techniques to investigate, for example, terms which caused potential buyers not to make a purchase, how long various pages of a multi-page transaction were viewed, exit points at which potential customers left a site, and so on. In such applications, the full content displayed to a client 402 may be retrieved and reviewed for investigation. Enhanced accuracy of data may be realized because users of the system will be motivated to provide accurate information during the course of a transaction. Further, paper-based and electronic documents may be collectively mined for information. In addition, structured search techniques may be applied to data of varying form, including, for example, individual pages of faxes, emails, form data, and so forth.

The document viewer 414 may use, for example, one or more Application Programming Interfaces ("API's") to interpret various types of media for display or searching. Each document, item of data, or other media captured during a transaction may be time stamped so that the document viewer may be used to view a complete transaction including the order in which all items were viewed and user inputs provided. Each document may be interpreted and searched in its native format so that, for example, facsimiles may be searched and viewed by individual page, print streams may be searched for graphical or alphanumeric content, and so forth. The document viewer may provide additional functionality, such as editing documents in native formats, zooming and panning within documents, and annotating documents within the viewer. Annotations on a document or other data may be stored by the document viewer 414 in the document repository 412 without modifying the underlying document or data.

The document viewer 414 may include tools for searching of documents and data stored in the document repository 412. This may include structured searching of meta-file data such as file type, creation date/time, file name, size, and so forth. Searching may also include text searching or other searching of data within documents. Hierarchical views may be provided for browsing and searching, such as by transaction type, transacting parties, and so forth. The document viewer 414 may be a thin client program, with documents and data from the document repository 412 converted to a common format (by, for example, a server) before presentation at the document viewer 414. The document viewer 414 may optionally retrieve and interpret documents and data in its native format, with one or more viewing technologies integrated into the viewer as, for example, Application Programming Interfaces ("APIs").

Transactions conducted between the client 402 and the server 406 may be captured by the filters 408. The filters 408 may also be used to capture transactions between the client 402 and the commerce site 420. The commerce site 420 may be a site maintained by, for example, a bank, a government agency, an insurance company, an electronic retailer, an investment or brokerage company, a real estate company, or any other company or government entity that might usefully conduct business using the network 404. Several topologies for capturing transactions with remote sites are described in more detail below in reference to FIGS. 6-8.

Figure 5:
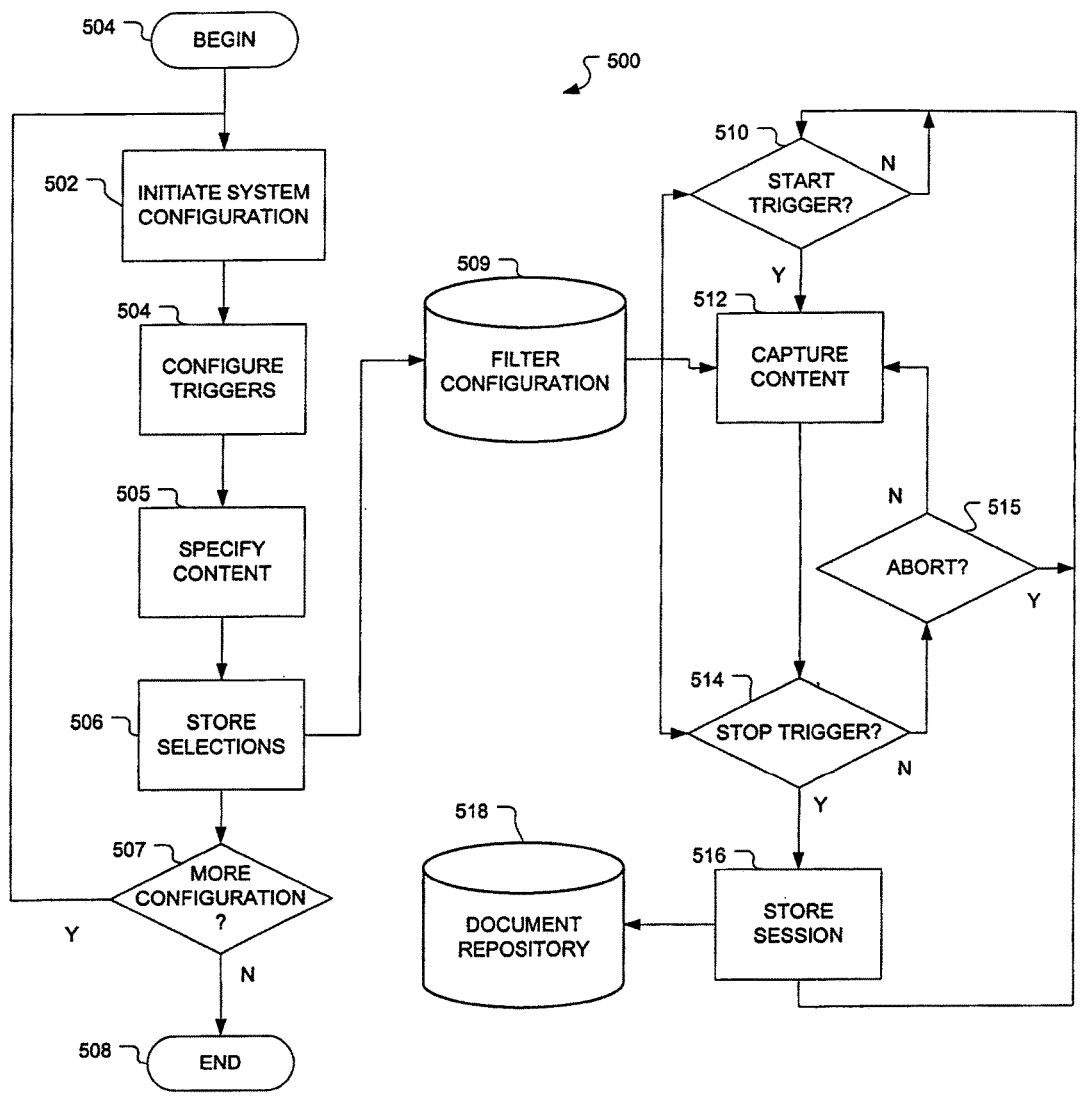
FIG. 5 is a flow chart of a transaction documentation process.

FIG. 5 is a flow chart of a transaction documentation process. The process 500 may begin 501 with an initiation of system configuration, as shown in step 502. This may be, for example, through the configuration interface 418 of FIG. 4. When a system configuration is initiated, the process 500 may proceed to step 504 where triggers may be configured. This may include specifying one or more start triggers, or events that should initiate a capture of data or documents, such as accessing a predetermined Web page. This may further include stop triggers that should conclude a capture of data, as well as abort triggers that should terminate a capture session without capturing data. Stop triggers may be, for example, navigation to one or more pages, or navigation away from one or more pages, as when a client leaves the domain where the transaction is being hosted. An abort trigger may be, for example, a timeout or a closed connection to the client.

When triggers are configured, the system may proceed to step 505 where content is specified. This may include a specification of what should be captured during a particular session, as described above with reference to FIG. 4. As noted above, certain content may be explicitly excluded from capture, such as any personal data or security data that is not required for the transaction. The specification of content may also include a specification of how a transaction is to be indexed when the transaction is stored. A specification of indexing may include, for example, any hierarchical or other criteria for organizing transactions, such as parties to a transaction, a transaction type, or any other data or meta-data that may be associated with a transaction or files belonging to a transaction.

When content has been specified, the process 500 may proceed to step 506 where selections may be stored as filter configurations in a database 509. Information stored in the filter configuration database 509 may be used during operation of filters, as shown in FIG. 5 by interconnections from the filter configuration database 509 to steps 510, 512, and 514 of the process 500. As shown in step 507, it may be determined whether more configuration is to be performed. If further configuration is indicated, the process 500 may return to step 502 where system configuration is initiated. If more configuration is not to be performed, then the process 500 may end, as shown in step 508.

As shown in step 510, filters may operate continuously on the server to detect occurrence of a start trigger. Where no start trigger is detected in step 510, the process 500 may return to step 510. Where a start trigger is detected, the process 500 may proceed to step 512 where content is captured. This may be any of the data associated with a transaction, including the data types described above in reference to FIG. 4. It should be appreciated that captured content may be transmitted to a document repository when it is captured, or the content may be buffered until a stop trigger or abort trigger is detected, at which time all of the captured content corresponding to a transaction may be transmitted to the document repository.

In step 514, it is determined whether a stop trigger is detected. This may be any event, such as navigation to a new address, activation of a button, or so forth. If no stop trigger is detected, the process 500 may proceed to step 515 where abort triggers are tested. An abort trigger may be, for example, a timeout after a predetermined period of inactivity. If no abort trigger is detected, then the process 500 may return to step 512 where additional content may be captured. If an abort trigger is detected, then the process 500 may reset and return to step 510 where a new start trigger is awaited. It will be appreciated that abort triggers may be continuously tested, through a separate execution thread or background process, so that an abort may occur at any time in the process 500.

If a stop trigger is detected in step 514, then the process 500 may proceed to step 516 where a session may be stored in a document repository 518, which may be the document repository of FIG. 4. The process may then return to step 510 where a new start trigger is awaited.

A number of variations of the process 500 are possible. For example, while the depicted process 500 shows storage of a session after a stop trigger, data and content associated with a transaction that is to be recorded may occur after transfer of each item of data, i.e., between step 512 and 514. Furthermore, additional steps may be included, such as retrieval/capture of paper documents such as scanned or faxed documents. It will be appreciated that certain transactions may not be completed in a single session. Certain transactions, such as real estate transactions, may involve a period of negotiations, as well as a collection and review of substantial paper-based information. In such a transaction, a transaction identifier may be included within the process 500 so that a transaction may be completed over a number of different sessions.

Figure 6:
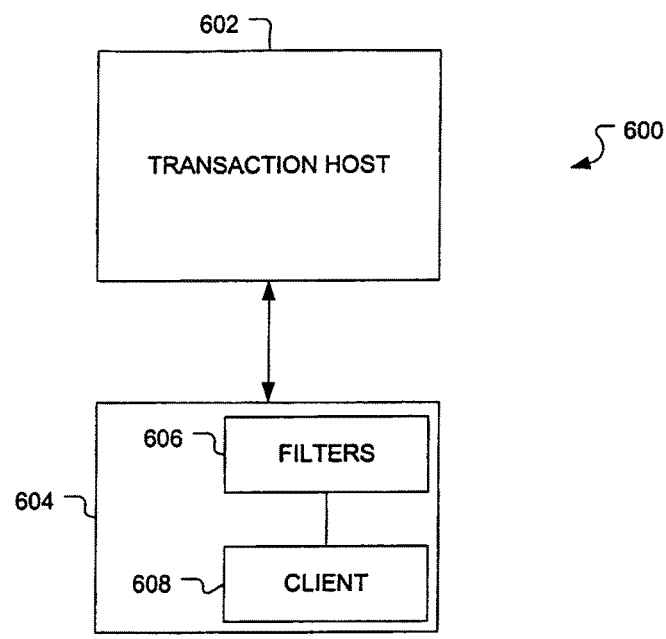
FIG. 6 shows a block diagram of a topology for a transaction management system.

FIG. 6 shows a block diagram of a topology for a transaction management system. The topology 600 may include a transaction host 602 connected in a communicating relationship with a client system 604 that includes filters 606 and a client 608. The transaction host may be a server configured to engage in electronic commerce as described above. The filters 606 may operate as a proxy for the client 608, presenting an interface such as a Web interface, to the client 608, and communicating with the transaction host 602 through a network. The filters 606 may store transactions in a document repository (not shown) at the client system 604, or at a remote site. The client system 604 may be any system that supports one or more clients 608, including, for example, a LAN, Corporate Area Network, or other network. This topology may have particular application where an entity, such as a government agency or a large corporation wishes to capture and manage transactions with a number of different transaction hosts 602. In one aspect, the system 600 may be used in a method of doing business to confirm transactions and resolve disputes relating to a transaction.

In one method of doing business, an independent third party may provide a server for capturing transactions. The server may be accessed by any party to a transaction, such as a buyer or seller, for a fee, in order to capture a transaction. The server may, upon request, establish a connection with the seller and a connection with the buyer, and transfer network traffic between the two parties while applying the filters to capture data related to the transaction. Should there be any dispute after the transaction is concluded, reference may be made to the captured documents, which may provide details of the exchange, and the order in which data and documents were transferred, during the transaction. This may include information of relevance to buyers and sellers alike, including legally binding terms of an agreement, price, description of services and so forth. Data may also include volatile data such as stock prices, interest rates, and auction bids that may be relevant to a particular transaction.

Figure 7:
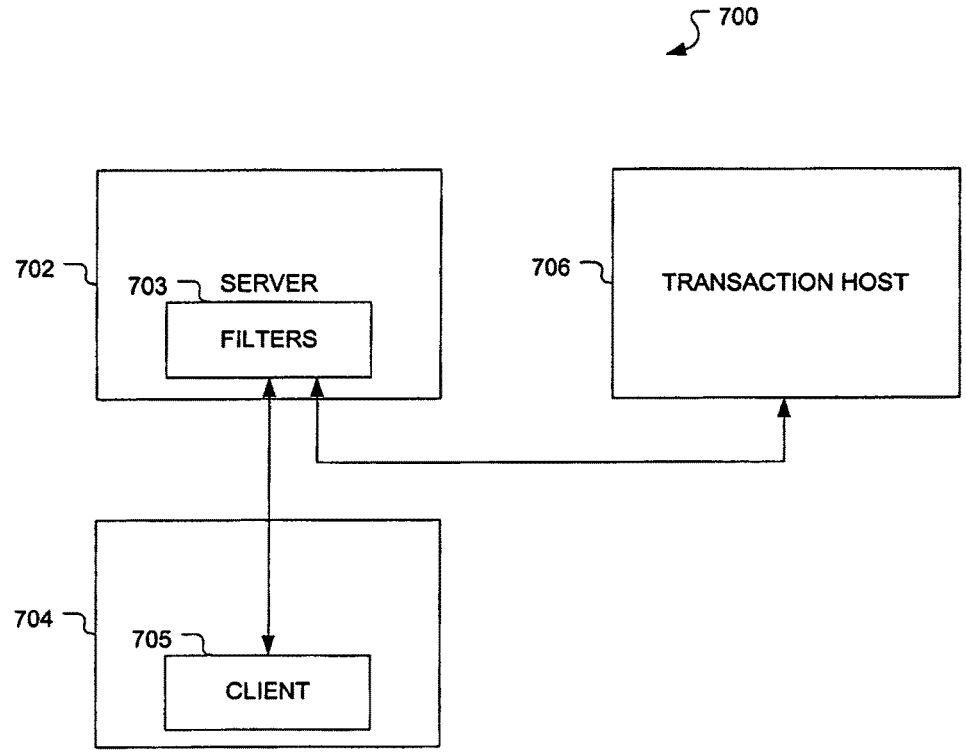
FIG. 7 shows a block diagram of a topology for a transaction management system.

FIG. 7 shows a block diagram of a topology for a transaction management system. In the system 700, a server 702 including filters 703 may operate between a client system 704 that includes a client 705 and a transaction host 706. The filters 703 may be accessible to the client 705 over a network, and the filters 703 on the server 702 may establish a connection with the transaction host 706 as a proxy for the client 705. The filters 703 may be configured by the client 705 to capture one or more transactions, such as electronic commerce transactions, between the client 705 and the commerce site 706. This service of monitoring on-line business may be made available to the client 705 on a per-transaction or subscription fee basis. Thus there is provided herein a method of doing business that includes providing a filter over a network to a client for capturing transactions with a remote electronic commerce site.

Figure 8:
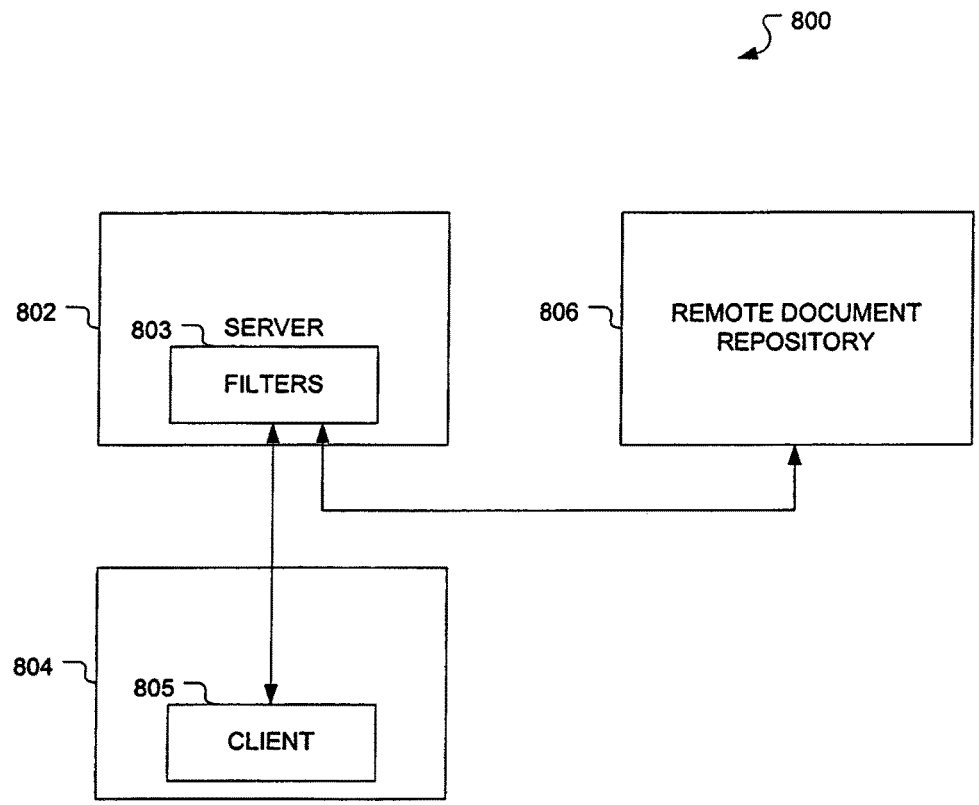
FIG. 8 shows a block diagram of a topology for a transaction management system.

FIG. 8 shows a block diagram of a topology for a transaction management system. The system 800 may include a server 802 that includes filters 803 connected in a communicating relationship with a client system 804 that includes a client 805, and also connected in a communicating relationship with a remote document repository 806. The server 802 may be an electronic commerce site hosting a transaction with the client 805. An independent third party may provide the remote document repository 806 as a service for an entity operating the server 802, and transactions stored in the remote document repository 806 may be accessible to the entity for review and monitoring of transactions. Transactions stored in the remote document repository 806 may also be accessible to the client 805, although access restrictions may be appropriate to limit the client 805 to transactions in which the client 805 was a party.

Although not shown in the above topologies, other applications of the filters described above may be used. For example, in the system of FIG. 4, the filters 408 may reside outside the server 406, such as between the server 406 and the network 404. It will be appreciated that, where secure communications are employed, the filters 406 may further include encryption and decryption processes as appropriate to maintain secure connections between components of the system. As another example, the filters 408 may reside on a load balancing router or other network switch that supports a plurality of servers conducting transactions. As a further example, the filters described herein, while generally depicted as separate processes accessible to a server, may be included in a server process as a service or function of the server. Thus, there is provided herein a server that includes configurable filters for capturing electronic commerce transactions conducted using the server.

It will be appreciated that systems such as those described above will have broad application in networked environments. The system may provide insurance in retail transactions, such as on-line purchases using a credit card. The system may also provide a platform for complex transactions such as home mortgages, home purchases, loans, insurance policy issuance and underwriting, and so on. However, it should further be appreciated that the systems described herein, and components of the systems, may be usefully employed in non-networked environments, or in environments that combine networked and non-networked aspects of a transaction. For example, a group of papers relating to a transaction may be scanned, faxed, or otherwise converted to an electronic form and stored in the document repository for subsequent retrieval and examination. In addition, a combination of paper documents and on-line documents may be stored in the document repository, so that a transaction that includes paper-based and electronic records may be captured by the system.

While the invention has been disclosed in connection with the preferred embodiments shown and described in detail, various modifications and improvements thereon will become readily apparent to those skilled in the art. Accordingly, the spirit and scope of the invention is to be limited only by the following claims and their legal equivalents.

What is claimed is:

1. A method of documenting computerized transactions, the method comprising:

initiating, by a server system having one or more server machines, a system configuration through a configuration interface, the configuration interface providing user control over triggers, the system configuration including configuring a filter with the triggers, the filter embodied on a non-transitory computer memory of the one or more server machines residing within the server system, the filter configured for passing data and control information between the server system and content resources for the server system;

operating the filter continuously on the server system;

receiving, by the server system from a client device, a request for content;

responsive to the request from the client device, detecting, by the server system, activation of a trigger in the filter operating on the server system;

responsive to the activation of the trigger in the filter operating on the server system, capturing, by the filter operating on the server system during multiple sessions of a computerized transaction, content associated with the computerized transaction, the capturing by the filter operating on the server system including time-stamping each document, item of data, or media captured by the filter operating on the server system during the multiple sessions of the computerized transaction; and storing, by the filter operating on the server system, the content captured by the filter operating on the server system in a repository of the server system.

2. The method according to claim 1, wherein the computerized transaction is conducted between the client device and the server system.

3. The method according to claim 1, wherein the computerized transaction is conducted between the client device and a network site external to the server system.

4. The method according to claim 1, wherein the filter is configured with a specification of content to be captured during a session.

5. The method according to claim 1, wherein the filter is configured with a specification of indexing on how the computerized transaction is to be indexed when the computerized transaction is stored.

6. The method according to claim 1, wherein the filter stores the content captured by the filter in the repository when the content is captured by the filter.

7. The method according to claim 1, wherein the content captured by the filter is buffered until a stop trigger or an abort trigger is detected, at which time the filter stores the content captured by the filter in the repository.

8. A computer program product for documenting computerized transactions, the computer program product comprising a non-transitory computer readable medium storing computer instructions translatable by a processor of a server system to perform:

initiating a system configuration through a configuration interface, the configuration interface providing user control over triggers, the system configuration including configuring a filter with the triggers, the filter embodied on a non-transitory computer memory of a server machine residing within the server system, the filter configured for passing data and control information between the server system and content resources for the server system;

operating the filter continuously on the server system;

receiving, from a client device, a request for content;

responsive to the request from the client device, detecting activation of a trigger in the filter operating on the server system;

responsive to the activation of the trigger in the filter operating on the server system, capturing, during multiple sessions of a computerized transaction, content associated with the computerized transaction, the capturing by the filter operating on the server system including time-stamping each document, item of data, or media captured by the filter operating on the server system during the multiple sessions of the computerized transaction; and storing the content captured by the filter operating on the server system in a repository of the server system.

9. The computer program product of claim 8, wherein the computerized transaction is conducted between the client device and the server system.

10. The computer program product of claim 8, wherein the computerized transaction is conducted between the client device and a network site external to the server system.

11. The computer program product of claim 8, wherein the filter is configured with a specification of content to be captured during a session.

12. The computer program product of claim 8, wherein the filter is configured with a specification of indexing on how the computerized transaction is to be indexed when the computerized transaction is stored.

13. The computer program product of claim 8, wherein the content captured by the filter is stored in the repository when the content is captured by the filter.

14. The computer program product of claim 8, wherein the content captured by the filter is buffered until a stop trigger or an abort trigger is detected, at which time the content captured by the filter is stored in the repository.

15. A system for documenting computerized transactions, the system comprising:

a server system having one or more server machines; and stored computer instructions translatable by processor of the server system to perform:

initiating a system configuration through a configuration interface, the configuration interface providing user control over triggers, the system configuration including configuring a filter with the triggers, the filter embodied on a non-transitory computer memory of the one or more server machines residing within the server system, the filter configured for passing data and control information between the server system and content resources for the server system;

operating the filter continuously on the server system;

receiving, from a client device, a request for content;

responsive to the request from the client device, detecting activation of a trigger in the filter operating on the server system;

responsive to the activation of the trigger in the filter operating on the server system, capturing, by the filter operating on the server system during multiple sessions of a computerized transaction, content associated with the computerized transaction, the capturing by the filter operating on the server system including time-stamping each document, item of data, or media captured by the filter operating on the server system during the multiple sessions of the computerized transaction; and storing the content captured by the filter operating on the server system in a repository of the server system.

16. The system of claim 15, wherein the computerized transaction is conducted between the client device and the server system.

17. The system of claim 15, wherein the computerized transaction is conducted between the client device and a network site external to the server system.

18. The system of claim 15, wherein the filter is configured with a specification of content to be captured during a session.

19. The system of claim 15, wherein the filter is configured with a specification of indexing on how the computerized transaction is to be indexed when the computerized transaction is stored.

20. The system of claim 15, wherein the storing the content captured by the filter in the repository, which is performed by the processor of the server system translating the stored computer instructions, further comprises storing the content when the content is captured by the filter.

21. The system of claim 15, wherein the storing the content captured by the filter, which is performed by the processor of the server system translating the stored computer instructions, further comprises buffering the content until a stop trigger or an abort trigger is detected, at which time the content captured by the filter is stored in the repository.

* * * * *